(12) United States Patent
Zhou et al.

(10) Patent No.: US 8,031,445 B2
(45) Date of Patent: Oct. 4, 2011

(54) LOW NOISE MAGNETO-RESISTIVE SENSOR UTILIZING MAGNETIC NOISE CANCELLATION

(75) Inventors: Yuchen Zhou, San Jose, CA (US); Kunliang Zhang, Fremont, CA (US); Yu-Hsai Chen, Mountain View, CA (US); Tong Zhao, Fremont, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 563 days.

(21) Appl. No.: 12/287,279

(22) Filed: Oct. 8, 2008

(65) Prior Publication Data

US 2010/0085666 A1 Apr. 8, 2010

(51) Int. Cl.
*G11B 5/127* (2006.01)

(52) U.S. Cl. .................... 360/324.12; 360/325

(58) Field of Classification Search ............. 360/324.12, 360/325
See application file for complete search history.

(56) References Cited

U.S. PATENT DOCUMENTS

| | | | |
|---|---|---|---|
| 7,160,572 B2 | 1/2007 | Fujikata et al. | |
| 7,177,122 B2 | 2/2007 | Hou et al. | |
| 2005/0088789 A1 | 4/2005 | Hou et al. | |
| 2005/0105219 A1 | 5/2005 | Mao et al. | |
| 2005/0118458 A1 | 6/2005 | Slaughter et al. | |
| 2006/0002035 A1 | 1/2006 | Gao et al. | |
| 2008/0158739 A1* | 7/2008 | Ide et al. ............. | 360/324.2 |

OTHER PUBLICATIONS

"Thermally Excited Low Frequency Magnetic Noise in CPP Structure MR Heads," by Zhou, IEEE Transactions on Magnetics, vol. 43, No. 6, Jun. 2007, pp. 2187-2192.
"White-noise magnetization fluctuations in magnetoresistive heads," by Neil Smith et al., Applied Physics Letters, vol. 78, No. 10, Mar. 5, 2001, pp. 1448-1450.
"Antiferromagnetic coupling by spin polarized tunneling," by Faure-Vincent et al., Journal of Applied Physics, vol. 93, No. 10, May 15, 2003, pp. 7519-7521.
"Oscillatory Magnetic Exchange Coupling through Thin Copper Layers," by Parkin et al., Physical Review Letters, vol. 66, No. 16, Apr. 22, 1991, pp. 2152-2155.
"Antiferromagnetic coupling in Fe/Cu/Fe and Co/Cu/Co multilayers on Cu(111)," by Egelhoff Jr. et al., Physical Review B, vol. 45, No. 14, Apr. 1, 1992-II, pp. 7795-7804, Surface and Microanalysis Science Division, National Institute of Standards and Technology, Gaithersburg, Maryland 20899, U.S. Government.

* cited by examiner

*Primary Examiner* — Hoai v Ho
(74) *Attorney, Agent, or Firm* — Saile Ackerman LLC; Stephen B. Ackerman

(57) ABSTRACT

A magnetic sensor, formed from a pair of magnetically free layers located on opposing sides of a non-magnetic layer, and method for its manufacture, are described. Biasing these free layers to be roughly orthogonal to one another causes them to be magnetostatically coupled in a weak antiferromagnetic mode. This enables the low frequency noise spectra of the two free layers to cancel one another. Careful control of the SH/TW ratio is an important feature of the device.

20 Claims, 4 Drawing Sheets

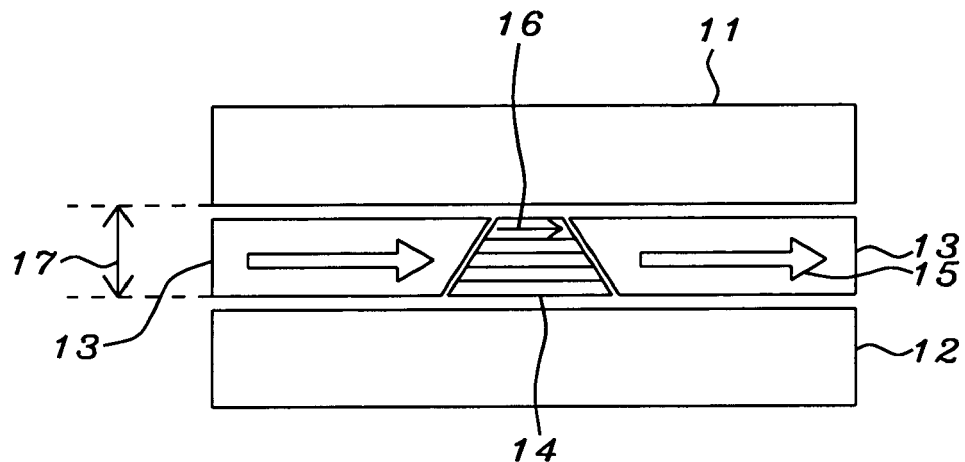
FIG. 1-Prior Art
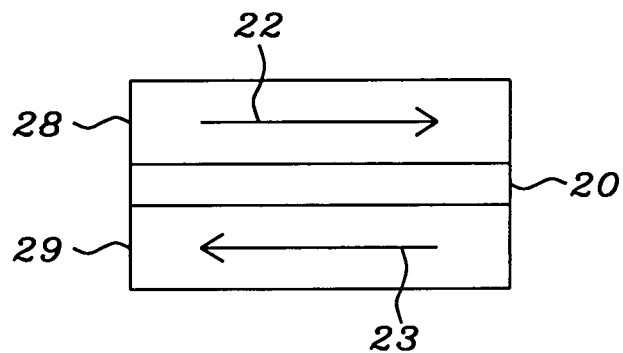
FIG. 2a
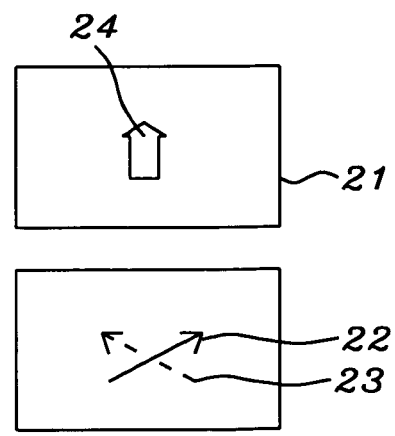
FIG. 2b

LOW NOISE MAGNETO-RESISTIVE SENSOR UTILIZING MAGNETIC NOISE CANCELLATION

FIELD OF THE INVENTION

The invention relates to the general field of GMR type magnetic sensors based on two free layers and no reference layer.

BACKGROUND OF THE INVENTION

With the ever-increasing need to increase the data areal density in hard disk drives, the magneto-resistive (MR) sensor that is used as the read-back element is increasingly required to have better spatial resolution while continuing to maintain a reasonable signal-to-noise (SNR) ratio. FIG. 1 shows the structure of a typical state of the art current-perpendicular-to-plane (CPP) MR read head. This usually includes a CPP-GMR (giant-magneto-resistive) or TMR (tunneling-magneto-resistive) head, which are the two main MR sensor structures in use in state-of-the-art hard disk drives.

The CPP MR head shown in FIG. 1 has top and bottom reader shields, 11 and 12. Hard bias (HB) magnets 13, at the sides and MR sensor stack 14, are located between the reader shields. HB 13 has longitudinal magnetization 15 and provides a biasing field for sensor stack 14 thereby orienting magnetization 16 of the free layer within the stack in the longitudinal direction. In today's hard drive, the magnetic head's flying height, above the disk storage medium layer, is already less than 10 nm and is approaching the regime of less than 5 nm, so the freedom to decrease the fly height further in order to increase the reader spatial resolution is reaching its limit. Thus, contemporary attempts to increase reader spatial resolution focus on reducing the read head's reader-shield-spacing (RSS), (designated 17 in FIG. 1).

To reduce RSS, both the thickness of MR sensor stack 14 and that of HB layer 13 need to decrease. However, thinning down the HB layer also implies a smaller HB pinning field at the free layer (FL) edges that will further degrade the SNR of the sensor. Additionally, a CPP MR sensor includes a multi-layer structure in proximity to the free layer which provides a reference direction for free layer magnetization rotation during signal read-back. Further decrease of sensor stack thickness will be limited by this reference multi-layer structure, which will become unstable and produce noise at low thicknesses. Thus, for the thinner RSS design to work well, a thin stack MR sensor without the reference structure and without the strong HB field is needed.

The prior art [2][3] has suggested the possibility of limiting the sensor to three layers—two magnetically free layers positioned on opposite sides of a non-magnetic layer. The two magnetic layers should be essentially identical, having similar magnetic moments, thicknesses and dimensions. An antiferromagnetic (AFM) coupling field exists between the magnetic layers either through magnetostatic interaction or by AFM type coupling through the non-magnetic layer [4][5].

Thus, in the absence of an external field, the magnetizations of the two layers will be anti-parallel to each other. However, for this type of tri-layer MR sensor to function at its maximum sensitivity, the two magnetizations need to be oriented nearly orthogonal to each other at zero applied state. An external permanent magnet may be used to bias the two magnetizations to around 45 degree relative to the air-bearing surface (ABS). In this way, the relative angle between the two magnetizations is close to 90 degree, i.e. the maximum sensitivity position.

The prior art is, however, silent as to how such tri-layer sensors will perform when their relative physical dimensions are varied or even if such variations could play a significant role in the sensor's applicability to actual magnetic read heads. The present invention explores some of these possibilities.

[1] Y. Zhou, "Thermally Excited Low Frequency Magnetic Noise in CPP structure MR heads," *IEEE Trans. Magn.*, vol. 43, pp. 2187, 2007

[2] S. Mao, et al, "Differential CPP reader for perpendicular magnetic recording," US 2005/0105219 A1 (2005)

[3] C. Hou, et al, "Biasing for tri-layer magnetoresistive sensors," US 2005/0088789 A1 (2005)

[4] W. F. Egelhoff Jr., and M. K. Kief, "Antiferromagnetic coupling in Fe/Cu/Fe and Co/Cu/Co multilayers on Cu(111)," *Phys. Rev., B* vol. 45, p.p. 7795, (1992)

[5] S. S. P. Parkin, R. Bhadra, and K. P. Roche, "Oscillatory magnetic exchange coupling through thin copper layers," *Phys. Rev. Lett.*, vol. 66, p.p. 2152, (1991)

[6] J. Faure-Vincent et al., "Antiferromagnetic coupling by spin polarized tunneling" *J.A.P.* vol. 93, p. 7519 (2003)

A routine search of the prior art was performed with the following references of interest being found:

U.S. Pat. No. 7,177,122 (Hou et al), U.S. Patent Applications 2006/0002035 (Gao et al), 2005/0105219 (Mao et al), and 2005/0088789 (Hou et al) all teach the tri-layer MR sensor, but do not mention the importance of the aspect ratio of strip height to track width or ferromagnetic coupling.

In U.S. Pat. No. 7,160,572, Fujikata et al. discuss reducing surface roughness to improve the quality of the MR sensor while U.S. Patent Application 2005/0118458 (Slaughter et al) teaches reducing surface roughness to reduce orange peel coupling.

SUMMARY OF THE INVENTION

It has been an object of at least one embodiment of the present invention to provide a magnetic sensor having high spatial resolution.

Another object of at least one embodiment of the present invention has been that said spatial resolution be achieved without significant deterioration in the signal-to-noise ratio of the device Still another object of at least one embodiment of the present invention has been that said spatial resolution be achieved without significant reduction of the dR/R ratio achieved by the device A further object of at least one embodiment of the present invention has been to provide a method for manufacturing said magnetic sensor.

These objects have been achieved by forming the sensor from a pair of magnetically free layers located on opposing sides of a non-magnetic layer, thereby eliminating the reference layer system as well as the longitudinal bias magnets that are part of a conventional GMR system.

An external magnet biases the magnetizations of the free layers so that they become roughly orthogonal to one another, which causes them to be magnetostatically coupled in a weak antiferromagnetic mode. In this mode, ferromagnetic coupling between the free layers is reduced to a minimum, which allows the low frequency noise spectra of the two free layers to cancel one another.

An important feature of the invention is that, for best results, the ratio of SH (stripe height) to TW (track width), which are the short and long dimensions respectively of the rectangle that defines the sensor, should be no more than 2:3.

BRIEF DESCRIPTION OF THE DRAWINGS

FIG. 1 shows a GMR device of the prior art including bias and reference layers.

FIGS. 2a and 2b show, respectively, ABS and plan views of a magnetic sensor according to the present invention.

DESCRIPTION OF THE PREFERRED EMBODIMENTS

Figure 3A:
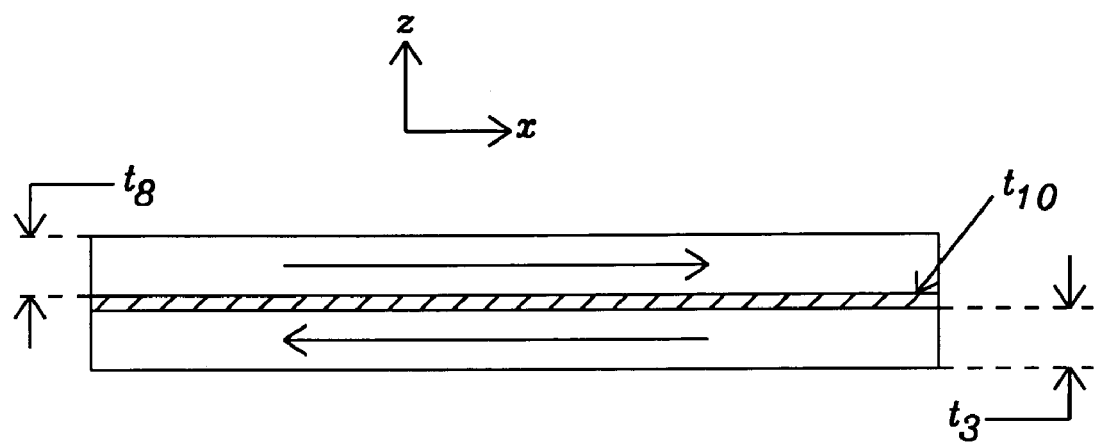
FIGS. 3a and 3b provide dimensional details for FIGS. 2a and 2b.

The invention discloses how effective magnetic noise cancellation can be achieved in MR sensors consisting of two magnetic free layers sandwiched on opposite sides of a non-magnetic layer, to which we will refer as a dual-free-layer MR sensor (DFL). This noise cancellation is achieved by a type of AFM coupling between the two free layers either through magneto-static interaction between the two free layers and/or by exchange coupling between the two magnetic layers through the non-magnetic layer. The discovered magnetic noise cancellation effect has been found to enhance the MR sensor's signal-to-noise-ratio (SNR) significantly.

We have determined that, at certain aspect ratios, a tri-layer MR sensor exhibits extremely low magnetic noise while producing very high noise at other aspect ratios. Additionally, we have established that several different types of coupling field may be in play between the two magnetic layers e.g. through the surface roughness of the non-magnetic layer. The latter is a mainly ferromagnetic type of coupling (known as 'orange peel' coupling) which the present invention discloses to be detrimental to the sensor SNR and it is a feature of the invention to minimize this type of coupling in order to achieve optimal performance.

Once proper noise cancellation is effected in a DFL structure, size-related noise increases will not be an issue for further reduction of MR sensor. The thermally excited magnetic noise normally present in a DFL will not be part of the final signal because of the noise cancellation technique, regardless of the size of the sensor.

For the noise cancellation effects discussed above to be fully effective it is essential to closely control the ratio of the physical stripe height to the physical track width, said ratio being conveniently referred to as the STR of the DFL.

If the STR is not kept within its correct value range the full benefit of noise cancellation will not be obtained. Furthermore, an incorrect STR value not only does not lead to thermal noise cancellation in DFL MR sensors during operation, but it also generates additional noise by enhancing non-thermal noise that originates between the two layers. We have determined the source of this additional noise to be any kind of ferromagnetic type coupling between the two free layers of the DFL, either magnetostatic or through exchange. It is therefore another important feature of the invention to achieve low, or near zero, ferromagnetic type coupling field between the two free layers of a DFL.

In FIGS. 2a and 2b, we show, respectively, ABS and top views of a sensor structure that embodies the main features of the invention. Seen there are magnetic layers 28 and 29 separated by non-magnetic layer 20 and magnetized in directions 22 and 23. An antiferromagnetic (AFM) coupling field exists between the magnetic layers. Also seen is permanent magnet 21 that provided hard bias in direction 24.

Figure 3B:
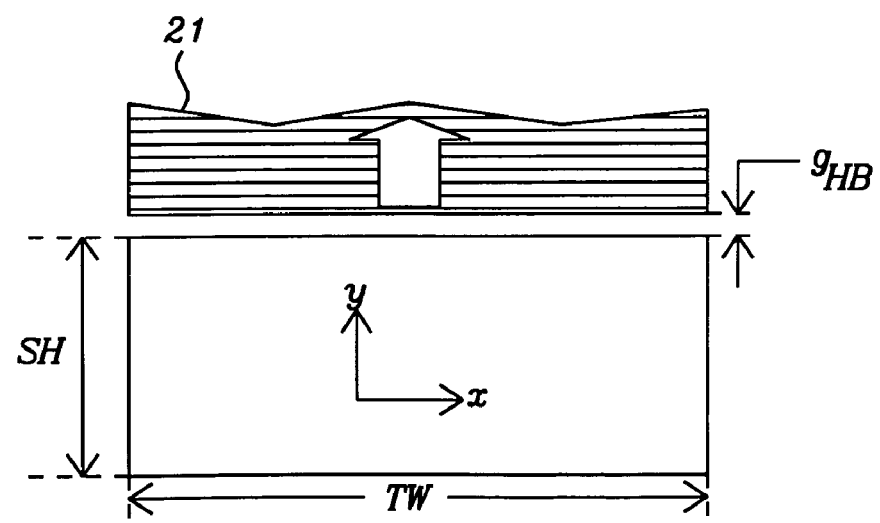

FIGS. 3a and 3b show dimensioned ABS and top views, respectively, of the sensor structure of the invention. Seen there are the track width (TW) and the stripe height (SH) of the sensor which correspond to the MR film's physical width when viewed from the ABS and to its physical height when viewed perpendicular to the film plane. $t_8$, $t_9$ and $t_{10}$ respectively represent the thickness of the two free layers and of the non-magnetic layer.

Figure 4:
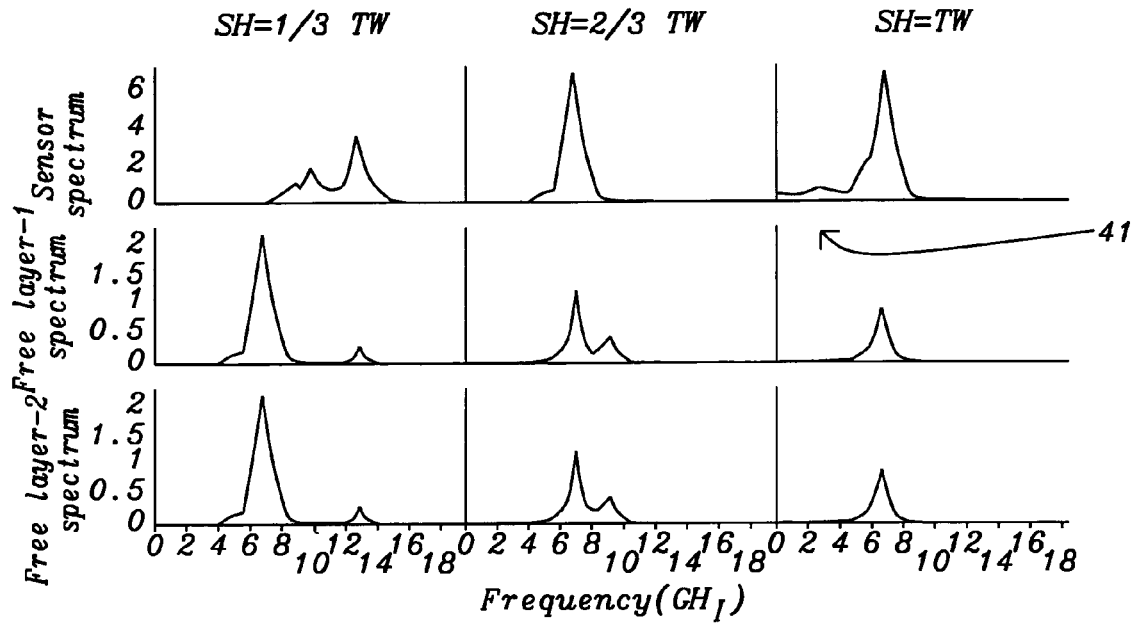
FIG. 4 shows frequency response spectra for both free layers as well as for the full device for 3 values of SH/TW.

FIG. 4 shows micro-magnetic simulation results of the noise spectra from the sensor of FIGS. 2 and 3 and the magnetization noise spectra within each of the two free layers, 18 and 19, at different SH/TW ratios. The two free layers 18 and 19 were assigned identical compositions, thicknesses and dimensions. The HB has a magnetic moment of at least 500 emu/cc, with from 800 to 1,000 emu/cc being preferred. This is enough to bias the two free layers so that their magnetizations point in directions that are close to 90 degree relative to each other, as was shown in FIG. 2. Under these conditions, the two layers only 'see' each other through a magnetostatic field that provides antiferromagnetic type coupling.

In order to ensure that any residual ferromagnetic coupling between the two layers is kept to a minimum, we do the following:

CPP GMR Case:

The thickness of the non-magnetic spacer layer (usually copper) is selected to be at one of the minima of the RKKY field strength vs. thickness curve (see refs. [4] and [5]) thereby resulting in a net AFM coupling. Note that while such AFM coupling (i.e. via the RKKY exchange field) is helpful for noise cancellation, it also reduces sensitivity. Accordingly, the induced field should be limited only a few hundred Oe, prefereably about 200 Oe.

TMR Case:

In general, the TMR barrier needs to be less than about 1 nm thick, in which range ferromagnetic coupling (due to orange peel coupling) is usually quite high. However, using as smooth a barrier as possible can significantly reduce this. Additionally, as detailed in ref. [6], the inclusion of one or more additional iron-rich magnetic layers can actually eliminate the ferromagnetic coupling field entirely.

When the measures outlined above have been taken, the amount of residual ferromagnetic coupling will be less than about 200 Oe.

The noise spectra in FIG. 4 are the so-called thermally excited magnetic noise spectra [1], the 0~2 GHz portion of which constitutes the observable magnetic noise that shows up during a read-back process. FIG. 4 shows that when SH=⅓ TW, the magnetization noise spectra of both free layers are almost identical. However, the total effective sensor noise does not exhibit the common peak around 7 GHz that shows up in the noise spectra within each layer. The disappearance of this peak confirms the cancellation effect of the noise between the two layers. During the thermal excitation of magnetic noise, one layer's magnetization fluctuation is almost exact same amplitude and phase of the other layer because of the anti-ferromagnetic type of coupling. Thus, the relative angle between the two magnetizations of the two layers does not vary much due to the in-phase magnetization fluctuation so the total sensor noise is low.

As SH approaches ⅔ and then 1, the noise cancellation effect gradually disappears, resulting in the appearance of noise in the low frequency part of the spectrum that precedes the peak. Because of this lack of noise cancellation, the sensor noise is much higher at the higher SH/TW ratios (see for example the section pointed to by arrow 41).

Figure 5:
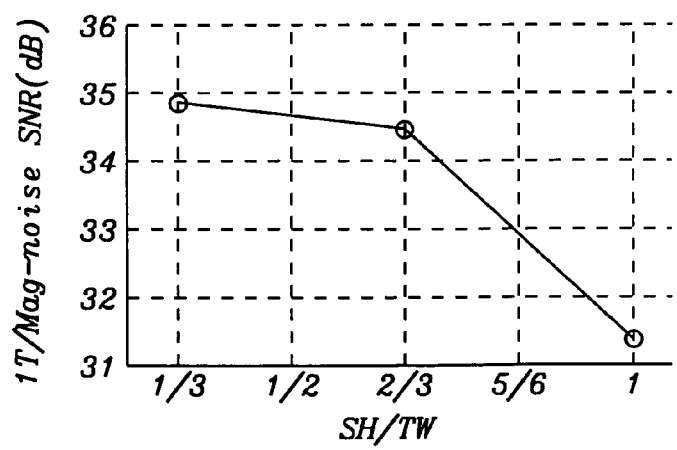
FIG. 5 compares SNR values as a function of SH/TW.

Referring next to FIG. 5, shown there is a simulation of signal-to-noise-ratio (SNR) using a single tone read-back signal power from data on the medium, i.e. 1 T single frequency pattern, and noise power calculated from the sensor noise spectrum within 0~1 GHz. The SNR was computed for different SH/TW ratios and shows that, as the SH/TW ratio of the simulated structure increases from ⅓ to 1, the sensor SNR decreases by more than 3 dB. This decrease is due both to reduced shape anisotropy in the TW direction as well as to a reduction of the coupling effect in the SH direction. From FIG. 5, it is clear that a SH/TW ratio of less than unity is needed for the DFL design to work best.

Effect of Ferromagnetic Type Coupling Between the Free Layers

Besides the SH/TW ratio that will determine DFL design's functionality, other type of coupling between the two free layers is also important factors. One of such coupling is the 'orange peel' coupling due to the roughness of the non-magnetic layer between the two free layers, which is intrinsically ferromagnetic type of coupling. Another possible coupling mechanism is RKKY coupling through a metallic non-magnetic layer such as Cu.

RKKY (Ruderman-Kittel-Kasuya-Yosida) coupling refers to a coupling mechanism of nuclear magnetic moments (or localized inner shell electron spins) in a metal, based on interaction through the conduction electrons. In GMR type devices, it has been observed that the coupling between thin layers of magnetic materials separated by a non-magnetic spacer material can alternate between ferromagnetic and antiferromagnetic as a function of the distance between the layers. This ferromagnetic/antiferromagnetic oscillation is one prediction of the RKKY theory.

From the above discussion on the noise cancellation effect, it is clear that any magnetostatic based antiferromagnetic coupling will be beneficial to noise cancellation whereas the presence of any ferromagnetic type of coupling is always undesirable when one wants to achieve low noise and a high SNR DFL design.

Figure 6A:
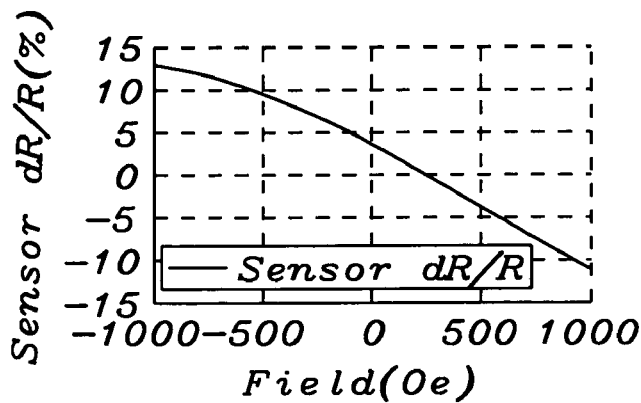
FIG. 6a plots dR/R as a function of the magnetic field being detected.
Figure 6B:
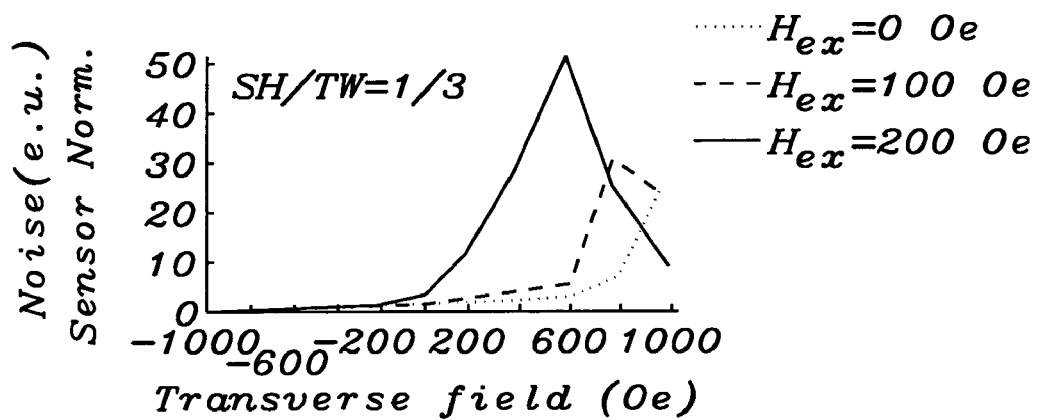
FIGS. 6b and 6c compare noise levels as a function of the transverse (permanent magnet) field for three different ferromagnetic-type coupling fields $H_{ex}$ and for two different values of SH/TW.
Figure 6C:
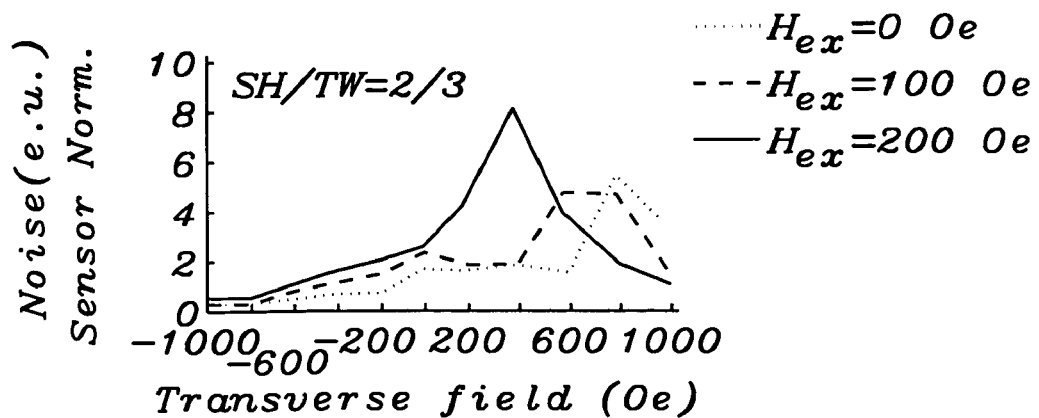

The FIGS. 6 illustrate the effect of ferromagnetic type coupling on the noise cancellation in DFL design. FIG. 6a shows an example of a simulated transfer curve of sensor resistance change (normalized to zero field resistance) vs. applied field for SH/TW=⅓. FIGS. 6b and FIG. 6c show low frequency noise power (<1 GHz) vs. applied transverse field along the transfer curve for SH values of ⅓ and ⅔ of the TW. These confirm that, at SH/TW=⅓, the noise level increases much faster when $H_{ex}$ is due to strong ferromagnetic-type coupling than it does when SH/TW=⅔.

Taken together, these show that in a DFL MR sensor, the magnetic noise is lowest for the anti-parallel state, where coupling induced noise cancellation is strongest. The noise increases as the parallel state is approached since the noise cancellation effect starts to diminish, turning to noise enhancement when even closer to the parallel state.

Additionally, as the ferromagnetic field increases, not only does the maximum noise power along the transfer curves increases significantly but the maximum noise peak moves towards the zero field point thereby elevating the zero field noise level. The noise level at zero field is a controlling factor in determining the MR sensor's effective SNR as it corresponds to the magnetic bit transition point during read-back. Thus, with higher ferromagnetic coupling field, the SNR of the DFL design will degrade significantly. Low ferromagnetic coupling between the two free layers (whether through exchange or some other mechanism) is therefore highly undesirable in a DFL design.

Advantages

The advantages of dual-free-layer (DFL) design are:
1. Enable narrow reader shield spacing without sacrificing HB stability
2. HB is not used to pin free layer edge but only provides a uniform bias field, which relieves the need of extremely narrow HB-FL spacing.
3. Noise increase due to smaller size sensor can be relieved by noise cancellation of the DFL
4. Magneto-static or other anti-ferromagnetic type of coupling field enhances noise cancellation of the two free layers at low SH/TW ratio Design Details The device comprises a non-magnetic layer sandwiched between two magnetically free layers. These three layers form a MR sensor stack having a physical width and physical height, with the height being no more than ⅔ of the physical width, with about ½ of the physical width being preferred. The non-magnetic layer can be a metal or a metal oxide.

A permanent magnet, whose magnetization can be set by a strong magnetic field, is located at the side of the of the tri-layer stack along one of the two width edges. The permanent magnet magnetization is set along the sensor stack height direction so that it magnetizes the free layers partially along the stack height direction. The two free layers experience an effective antiferromagnetic coupling field from one another, either through magnetostatic interation or through coupling through the non-magnetic layer, for example by RKKY coupling through a Cu layer. When this coupling is combined with the permanent magnet field, the free layer magnetizations essentially orthorganal to each other. In the presence of an external field, the relative angle of the two magnetizations will change with the resistance across the sensor stack following suit accordingly.

Thus, since there is no longer a reference layer structure, the sensor is able to have a resolution of less than 10 nm while still providing the maximum available dR/R value and while also continuing to maintain an acceptable SNR.

What is claimed is:

1. A method to manufacture a magnetic sensor, comprising:
    depositing, in unbroken succession on a substrate, a first magnetic free layer, having a thickness and a composition, a non-magnetic layer having a thickness and a composition, and a second magnetic free layer, having a thickness and a composition, thereby forming a sensor stack;
    patterning said sensor stack to form a sensor that has, when viewed from above, an approximately rectangular shape with a short dimension SH and a long dimension TW;
    dimensioning SH and TW so that SH has a value that is from ⅓ to ⅔ that of TW;
    adjusting the thickness and the composition of said non-magnetic layer so as to minimize ferromagnetic coupling between said first and second magnetic free layers, thereby reducing noise in a signal generated by said magnetic sensor;
    adjusting said thicknesses and compositions of said magnetic free layers whereby there is a net antiparallel magnetic coupling between said magnetic free layers;

depositing and then patterning a layer of magnetically hard material to form a permanent magnet that is located a distance from said sensor; and permanently magnetizing said permanent magnet to a sufficient extent to cause said free layers to be magnetized in directions that are approximately orthogonal to one another.

2. The method recited in claim 1 wherein said two magnetically free layers have approximately equal magnetic moments.

3. The method recited in claim 1 wherein the said antiferromagnetic coupling between said free layers is a magnetostatic type of coupling.

4. The method recited in claim 1 wherein said antiparallel coupling between said free layers is due to spin polarized tunneling of electrons through an oxide barrier.

5. The method recited in claim 1 wherein said antiferromagnetic coupling between said free layers is an exchange type of coupling deriving from RKKY coupling through a Cu layer having a thickness range of from 1-5 nm, said thickness range being subject to further reduction when magnetic layer composition and thickness have been optimized.

6. The method recited in claim 1 wherein any residual ferromagnetic coupling between said free layers in said sensor is at most 200 Oe.

7. The method recited in claim 1 wherein said non-magnetic layer is an oxide of a metal selected from the group consisting of Al, Mg, Ti, Hf, Zr, Zn, and their alloys.

8. The method recited in claim 1 wherein said non-magnetic layer is a metal selected from the group consisting of Cu, Ag, Au, Ru, and Mg.

9. The method recited in claim 1 wherein said non-magnetic layer further comprises at least one layer that is an oxide of a metal selected from the group consisting of Al, Mg, Ti, Hf, Zr, Zn, and their alloys, and at least one layer of a metal selected from the group consisting of Cu, Ag, Au, Ru, and Mg.

10. The method recited in claim 1 wherein said magnetic free layers each comprises one or more elements selected from the group consisting of Fe, Co, Ni, B, Mn, Cr, Hf, Cu, Zr, Ta, Ti, and their alloys.

11. A high resolution, low noise magnetic sensor, comprising:

on a substrate, a three layer stack that comprises a first magnetic free layer on a non-magnetic layer, having a thickness and a composition, that is on a second magnetic free layer;

said three layer stack having, when viewed from above, an approximately rectangular shape with a short dimension SH and a long dimension TW;

SH and TW having values such that SH is from $\frac{1}{3}$ to $\frac{2}{3}$ TW;

said thickness and composition of said non-magnetic layer being such as to minimize ferromagnetic coupling between said first and second magnetic free layers, to have an effective net antiparallel coupling between said magnet free layers, and to reduce noise in a signal generated by said magnetic sensor,;

a permanent magnet that is located a distance from said sensor; and said permanent magnet being magnetized to a sufficient extent to cause said free layers to be magnetized in directions that are approximately orthogonal to one another.

12. The sensor described in claim 11 wherein said two magnetic free layers have approximately equal magnetic moments.

13. The sensor described in claim 11 wherein the said antiferromagnetic coupling between said free layers is a magnetostatic type of coupling.

14. The sensor described in claim 11 wherein said antiparallel coupling between said free layers is due to spin polarized tunneling of electrons through an oxide barrier.

15. The sensor described in claim 11 wherein said antiferromagnetic coupling between said free layers is an exchange type of coupling deriving from RKKY coupling through a Cu layer having a thickness range of from 1-5 nm, said thickness range being subject to further reduction when magnetic layer composition and thickness have been optimized.

16. The sensor described in claim 11 wherein any residual ferromagnetic coupling between said free layers in said sensor is at most 200 Oe.

17. The sensor described in claim 11 wherein said non-magnetic layer is an oxide of a metal selected from the group consisting of Al, Mg, Ti, Hf, Zr, Zn, and their alloys.

18. The sensor described in claim 11 wherein said non-magnetic layer is a metal selected from the group consisting of Cu, Ag, Au, Ru, and Mg.

19. The sensor described in claim 11 wherein said non-magnetic layer further comprises at least one layer that is an oxide of a metal selected from the group consisting of Al, Mg, Ti, Hf, Zr, Zn, and their alloys, and at least one layer of a metal selected from the group consisting of Cu, Ag, Au, Ru, and Mg.

20. The sensor described in claim 11 wherein said magnetic free layers each comprise one or more elements selected from the group consisting of Fe, Co, Ni, B, Mn, Cr, Hf, Cu, Zr, Ta, Ti, and their alloys.

* * * * *